US012525107B2

(12) United States Patent
Forster

(10) Patent No.: US 12,525,107 B2
(45) Date of Patent: Jan. 13, 2026

(54) MODIFICATION OF TRIGGER THRESHOLDS OF RFID DEVICES IN AN ELECTRONIC ARTICLE SURVEILLANCE SYSTEM

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/760,062

(22) PCT Filed: Feb. 5, 2021

(86) PCT No.: PCT/US2021/016836

§ 371 (c)(1),
(2) Date: Aug. 3, 2022

(87) PCT Pub. No.: WO2021/158926

PCT Pub. Date: Aug. 12, 2021

(65) Prior Publication Data

US 2022/0398909 A1 Dec. 15, 2022

Related U.S. Application Data

(60) Provisional application No. 62/970,933, filed on Feb. 6, 2020.

(51) Int. Cl.
*G08B 13/24* (2006.01)
*G08B 29/26* (2006.01)

(52) U.S. Cl.
CPC ..... *G08B 13/2482* (2013.01); *G08B 13/2417* (2013.01)

(58) Field of Classification Search
CPC .................................................. G08B 13/2482
See application file for complete search history.

(56) References Cited

U.S. PATENT DOCUMENTS 5,257,009 A 10/1993 Narlow
5,767,808 A 6/1998 Robbins et al.
(Continued)

FOREIGN PATENT DOCUMENTS

CN 107944312 4/2018
JP 10-512412 11/1998
(Continued)

OTHER PUBLICATIONS

International Preliminary Report on Patentability dated Jul. 28, 2022 issued in corresponding IA No. PCT/US2021/016842 filed Feb. 5, 2021.
(Continued)

*Primary Examiner* — Davetta W Goins
*Assistant Examiner* — Pameshanand Mahase

(57) ABSTRACT

Electronic surveillance article systems reducing the number and likelihood of false alarms are provided. Such systems include two read zones, with a second read zone having an associated RFID reader configured to detect an RFID device at a trigger threshold. The trigger threshold may be set or modified in view of a value of a sensor of an RFID device (sensing a capacitance or dielectric permittivity or temperature or degree of movement, for example), the number of times the RFID device is detected in the first read zone, or whether the RFID device is detected in the first read zone under predetermined conditions. Such systems may also or alternatively initiate a response (e.g., modifying the trigger threshold or the amount of power transmitted by an RFID
(Continued)

reader) when an RFID guard device associated with a piece of infrastructure in the first read zone is detected in the second read zone.

8 Claims, 2 Drawing Sheets

(56) References Cited

U.S. PATENT DOCUMENTS

| | | | | |
|---|---|---|---|---|
| 7,591,422 | B2 | 9/2009 | Maitin | |
| 2001/0013830 | A1 | 8/2001 | Garber et al. | |
| 2005/0200539 | A1 | 9/2005 | Forster et al. | |
| 2006/0186994 | A1* | 8/2006 | Lin | G08B 13/1418 726/20 |
| 2007/0296581 | A1* | 12/2007 | Schnee | G08B 13/2482 340/8.1 |
| 2009/0309729 | A1* | 12/2009 | Nichols | A45C 1/10 340/568.7 |
| 2010/0052865 | A1 | 3/2010 | Eckstein | |
| 2011/0074582 | A1 | 3/2011 | Alexis | |
| 2011/0291803 | A1* | 12/2011 | Bajic | G08B 13/2462 340/10.1 |
| 2012/0044074 | A1* | 2/2012 | Mulla | G08B 13/2448 340/572.1 |
| 2012/0268327 | A1 | 10/2012 | Sardariani et al. | |
| 2013/0187778 | A1* | 7/2013 | Smith | G08B 13/242 340/572.1 |
| 2014/0266617 | A1* | 9/2014 | Wilkinson | G08B 13/2417 340/10.1 |
| 2015/0069135 | A1 | 3/2015 | Kang et al. | |
| 2016/0253534 | A1 | 9/2016 | Hattori et al. | |
| 2017/0063476 | A1 | 3/2017 | Nair | |
| 2018/0350218 | A1 | 12/2018 | Jeon et al. | |
| 2018/0374328 | A1* | 12/2018 | Man | G08B 13/2485 |
| 2019/0188982 | A1* | 6/2019 | Lavery | G08B 13/2434 |
| 2019/0325173 | A1 | 10/2019 | Tingler et al. | |
| 2020/0394490 | A1 | 12/2020 | Abergel et al. | |
| 2021/0034937 | A1* | 2/2021 | Shakedd | H04L 9/14 |

FOREIGN PATENT DOCUMENTS

| | | |
|---|---|---|
| JP | 11-340719 | 12/1999 |
| JP | 2005-258793 | 9/2005 |
| JP | 2008-519530 | 6/2008 |
| JP | 2009-511999 | 3/2009 |
| JP | 2015-511412 | 4/2015 |
| WO | 02/48980 | 6/2002 |
| WO | 2005/112591 | 12/2005 |
| WO | 2006/050462 | 5/2006 |
| WO | 2014/150531 | 9/2014 |

OTHER PUBLICATIONS

International Preliminary Report on Patentability dated Jul. 28, 2022 issued in corresponding IA No. PCT/US2021/016836 filed Feb. 5, 2021.

Invitation to Pay Additional Fees dated Jun. 8, 2021 issued in corresponding IA No. PCT/US2021/016842 filed Feb. 5, 2021.

International Search Report and Written Opinion dated Aug. 2, 2021 issued in corresponding IA No. PCT/US2021/016842 filed Feb. 5, 2021.

International Search Report and Written Opinion dated Jul. 19, 2021 issued in corresponding IA No. PCT/US2021/016836 filed Feb. 5, 2021.

Invitation to Pay Additional Fees dated May 26, 2021 issued in corresponding IA No. PCT/US2021/016836 filed Feb. 5, 2021.

* cited by examiner

MODIFICATION OF TRIGGER THRESHOLDS OF RFID DEVICES IN AN ELECTRONIC ARTICLE SURVEILLANCE SYSTEM

CROSS-REFERENCE TO RELATED APPLICATION

The present application is a 371 of International Application No. PCT/US2021/016836, which was published in English on Aug. 12, 2021, and claims the benefit of U.S. Provisional Patent Application No. 62/970,933 filed Feb. 6, 2020, both of which are incorporated herein by reference in their entireties.

FIELD

The present subject matter relates to radio frequency identification ("RFID") devices. More particularly, the present subject matter relates to controlling the trigger thresholds of RFID devices used in an electronic article surveillance ("EAS") system.

BACKGROUND

In retail stores, an accurate count of the products on display and/or in inventory is important. Additionally, it is important to have an effective anti-theft system in place. RFID tags and labels (which may be collectively referred to herein as "RFID devices") have been employed to perform both of these functions.

An EAS system employing RFID technology typically has two primary read zones, each of which includes an associated RFID reader. One of the read zones is an area in the store where the products are presented to the consumer (which may be referred to herein as "inventory zone"), while the other read zone is an area at the exit of the store where any RFID devices that have not been suitably deactivated may be detected (which may be referred to herein as a "detection zone") to trigger some type of alarm, indicating that an attempt is being made to steal the product(s). Typically, when a customer properly purchases an item, the cashier either removes or deactivates the RFID device associated with it. If the RFID device is not removed or deactivated, an RFID reader or readers will read the device and cause an alarm or other alert to trigger in the detection zone.

Although the above-described systems are widespread, there are certain disadvantages. When using RFID devices/systems for an EAS system, one common problem is that the read range of an RFID device in certain circumstances can be large enough that an RFID device in the inventory zone can be read in the detection zone or vice versa. To reduce this risk, a transition zone is frequently provided between the inventory zone and the detection zone to physically separate the two read zones. However, on account of different RFID devices having greater sensitivity at an operating frequency and/or different articles having different effects on the performance of the associated RFID devices, it is necessary for the transition zone to be relatively large. Large transition zones mean smaller inventory zones which means less physical space for the retailer to present merchandise to consumers and therefore lost sales (revenue).

There exists a need for an inventory management/EAS system in which the inventory zone is maximized while the transition zone is reduced or minimized yet still effective at detecting theft and reducing or minimizing false alarms.

It would, thus, be advantageous to provide an EAS system that is configured in a way that allows for the size of the transition zone to be reduced and/or for the incidence of false alarms to be reduced.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an electronic article surveillance system includes a first read zone having an associated RFID reader and a second read zone having an associated RFID reader configured to detect an RFID device at a trigger threshold. The system further includes a controller configured to set the trigger threshold based at least in part on a factor selected from the group consisting of a value of a sensor of an RFID device, a number of times that an RFID device is detected in the first read zone, and whether an RFID device is detected in the first read zone under predetermined conditions.

In another aspect, a method is provided for controlling an electronic article surveillance system having first and second read zones, with an RFID device being detected in the second read zone at a trigger threshold. The method includes setting the trigger threshold based at least in part on a factor selected from the group of a value of a sensor of an RFID device, a number of times that an RFID device is detected in the first read zone, whether an RFID device is detected in the first read zone under predetermined conditions, and combinations thereof.

In yet another aspect, an electronic article surveillance system includes a first read zone including an associated RFID reader, with a piece of infrastructure at least partially positioned within the first read zone. An RFID guard device is secured with respect to the piece of infrastructure. A second read zone of the systems includes an associated RFID reader configured to detect an RFID inventory device associated with a piece of inventory removably associated with the piece of infrastructure at a trigger threshold. The system also includes a controller configured to, when the RFID guard device is detected by the RFID reader, initiate a response selected from the group consisting of modifying the trigger threshold, modifying an amount of power transmitted by the RFID reader associated with the second read zone, modifying a direction in which power is transmitted by the RFID reader associated with the second read zone, and transmitting a signal indicative of a need to move the piece of infrastructure away from the second read zone.

In another aspect, a method is provided for controlling an electronic article surveillance system having first and second read zones, with a piece of infrastructure at least partially positioned within the first read zone and having an associated RFID guard device, and with an RFID inventory device associated with a piece of inventory removably associated with the piece of infrastructure being detected in the second read zone at a trigger threshold. The method includes, upon detecting the RFID guard device in the second read zone, initiating a response selected from the group consisting of modifying the trigger threshold, modifying an amount of power transmitted by an RFID reader associated with the second read zone, modifying a direction in which power is transmitted by an RFID reader associated with the second read zone, and transmitting a signal indicative of a need to move the piece of infrastructure away from the second read zone.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
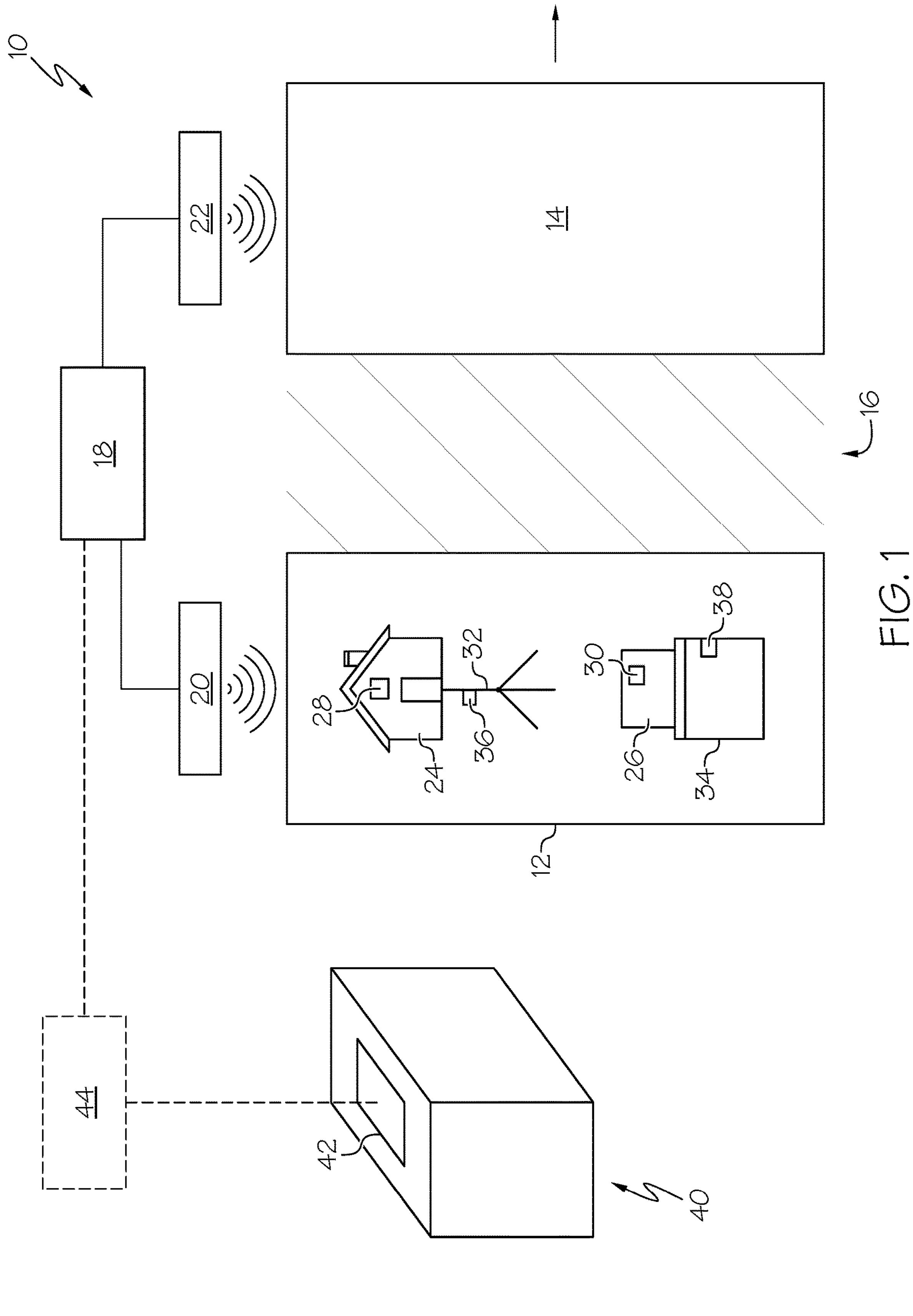
FIG. 1 is an illustrative representation of an exemplary embodiment of an electronic article surveillance system according to an aspect of the present disclosure.

FIG. 1 shows an EAS system 10 employing RFID technology according to an aspect of the present disclosure. The EAS system 10 of FIG. 1 has an inventory zone 12 and a detection zone 14, with a transition zone 16 separating the two read zones 12 and 14. The EAS system 10 further includes a controller 18, which is coupled to a first RFID reader 20 associated with the inventory zone 12 and a second RFID reader 22 associated with the detection zone 14. A plurality of pieces of inventory 24 and 26 are shown as being positioned within the inventory zone 12, with each piece of inventory 24, 26 having an associated RFID device 28, 30 (which may be referred to herein as an RFID inventory device). The pieces of inventory 24 and 26 may be differently configured, thereby differently affecting the performance of the associated RFID device 28, 30, as will be described in greater detail herein.

As explained above, the inventory zone 12 represents an area in the store where products are presented to the consumer, while the detection zone 14 represents an area at the exit of the store where any RFID inventory devices that have not been suitably deactivated may be detected to trigger some type of alarm, indicating that an attempt is being made to steal them. When a customer properly purchases an item, the cashier either removes or deactivates the RFID inventory device associated with it. If the RFID inventory device is not removed or deactivated, it will be detected in the detection zone 14, which causes an alarm or other alert to trigger and notify store personnel.

Each piece of inventory 24, 26 is shown in FIG. 1 as being removably associated with a piece of infrastructure 32, 34 configured to support and display the associated piece or pieces of inventory in the inventory zone 12. In the illustrated embodiment, one of the pieces of infrastructure 32 is configured as a mannequin, while the other piece of infrastructure 34 is configured as a table, though it should be understood that pieces of infrastructure may be otherwise configured without departing from the scope of the present disclosure. In the embodiment of FIG. 1, each piece of infrastructure 32, 34 includes an associated RFID device 36, 38 (which may be referred to herein as an RFID guard device) that is secured with respect to the piece of infrastructure 32, 34 (e.g., by being affixed to the piece of infrastructure 32, 34). Unlike the RFID inventory devices 28 and 30, the RFID guard devices 36 and 38 are not configured to generate an alarm when they are detected in the detection zone 14, but may be used to reduce false alarms arising from the detection of an RFID inventory device in the detection zone 14, as will be described in greater detail.

The EAS system 10 of FIG. 1 is shown as including an additional read zone 40, which is configured to receive pieces of inventory before they are moved into the inventory zone 12. This initial or preliminary read zone 40 is provided to determine the number of pieces of inventory in stock before the pieces of inventory are moved into the inventory zone 12 for display and consideration by customers. The initial or preliminary read zone 40 may be variously configured without departing from the scope of the present disclosure. In the illustrated embodiment, the initial or preliminary read zone 40 is configured as an RFID read chamber, which includes an associated RFID reader 42 and is configured to receive a plurality of pieces of inventory and their associated RFID devices. An RFID read chamber may be relatively large (e.g., configured to accommodate a plurality of containers loaded on a pallet) or smaller (e.g., configured to accommodate a single container), depending on the needs and configuration of the store. In other embodiments, the initial or preliminary read zone 40 (if provided) may be differently configured, such as being configured as an RFID-enabled gate through which inventory passes before reaching the inventory zone 12 or as a warehouse or storage area in which RFID inventory devices are detected or read by handheld RFID readers operated by store personnel, for example.

It should be understood that the configuration illustrated in FIG. 1 is merely exemplary and that EAS systems according to the present disclosure may be differently configured without departing from the scope of the present disclosure. For example, while FIG. 1 illustrates separate RFID readers 20 and 22 associated with the inventory zone 12 and the detection zone 14, it is within the scope of the present disclosure for a single RFID reader 46 to be associated with the two zones 12 and 14, as in the EAS system 10' shown in FIG. 2. In some embodiments, the inventory zone and/or the detection zone has a plurality of readers, e.g., 2, 3, 4, 5, or greater. In some embodiments, the plurality of readers is controlled by a single controller. In other embodiments, each of the readers is controlled by its own controller. In still other embodiments, the plurality of readers is controlled by more than one controller but the number of controllers is less than the number of readers, such that at least more than one reader is controlled by one controller.

Figure 2:
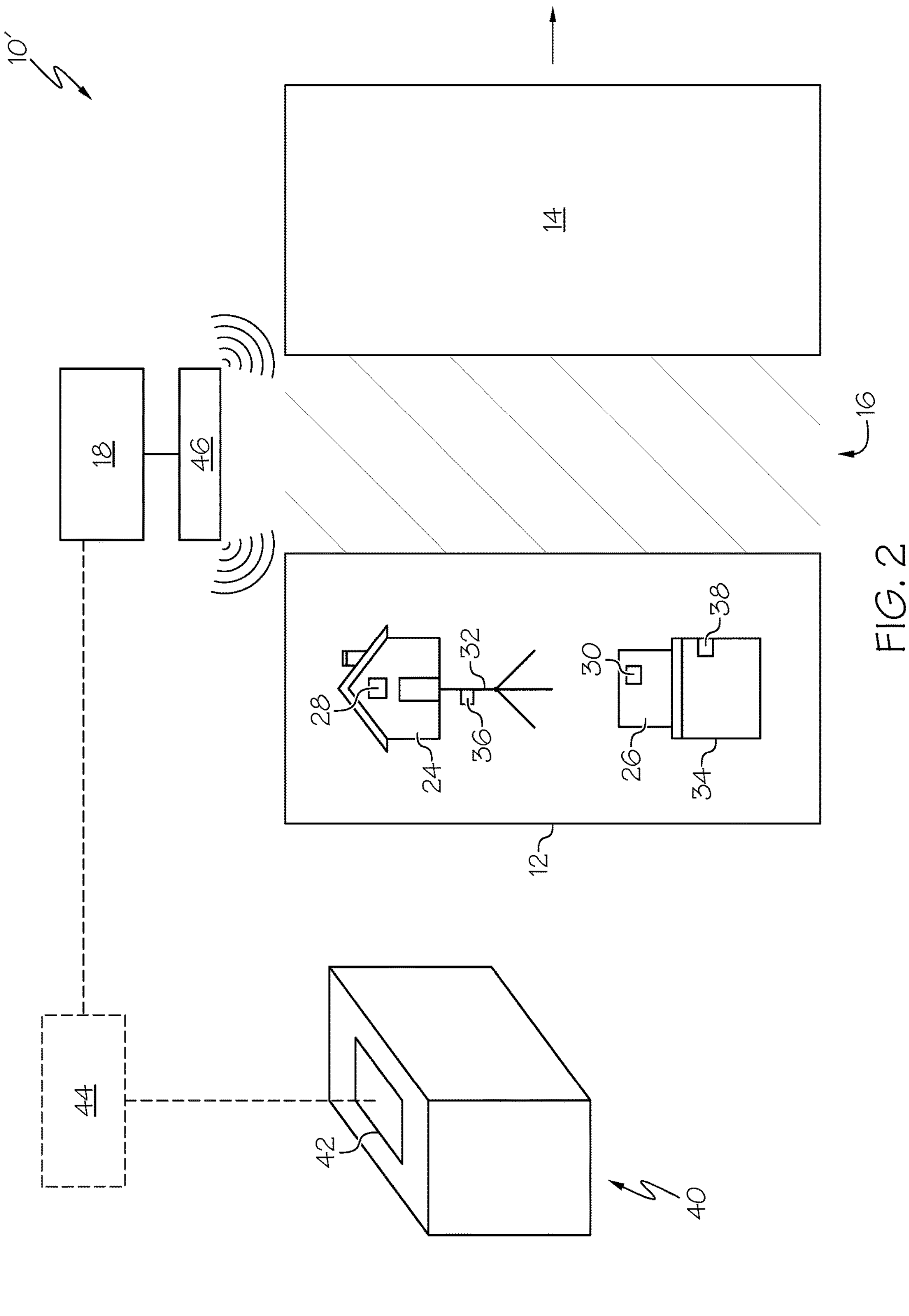
FIG. 2 is an illustrative representation of another exemplary embodiment of an electronic article surveillance system according to an aspect of the present disclosure.

Regardless of the particular configuration of the EAS system, the transition zone 16 is ideally sized and configured such that RFID devices (especially RFID inventory devices) positioned in the inventory zone 12 are only detected by the RFID reader 20 associated with the inventory zone 12 and not by the RFID reader 22 associated with the detection zone 14 (or, in the case of the system 10' of FIG. 2, only by a signal emitted by the RFID reader 18 into the inventory zone 12 and not into the detection zone 14). The opposite is also true, with it being advantageous for RFID devices positioned in the detection zone 14 to be detected only in the detection zone 14 and not in the inventory zone 12. This may be achieved by providing a large transition zone 16, although such an approach reduces the size of the inventory zone 12, so it is an unsatisfactory solution.

According to one aspect of the present disclosure, the size of the transition zone 16 may be decreased by instead adjusting the level at which an RFID inventory device is detected in the detection zone 14 (which level may be referred to herein as the "trigger threshold"). While this aspect of the present disclosure is described in terms of adjustment of the trigger threshold of the detection zone 14 (to prevent false alarms when an RFID inventory device in the inventory zone 12 is detected in the detection zone 14), it should be understood that the trigger threshold of the inventory zone 12 may be similarly adjusted to prevent situations in which an RFID device in the detection zone 14 is detected in the inventory zone 12.

There are several factors that can affect the performance characteristics of an RFID device (and, thus, whether such an RFID device is detected in a separate read zone), such that there are various conditions that may warrant a change in the trigger threshold for a particular RFID device. According to one approach, an RFID inventory device may include a sensor that records a particular value that may be transmitted to the controller 18 of the EAS system 10, 10'. Depending on the value of the sensor, the controller 18 may determine whether to adjust the trigger threshold for the RFID inventory device in which the sensor is associated, which may include decreasing the trigger threshold (e.g., if the value indicates that the piece of inventory associated with the RFID inventory device is at risk of being stolen) or increasing the trigger threshold (e.g., if the value indicates that the piece of inventory associated with the RFID inventory device is not at risk of being stolen). The various RFID inventory devices may each be programmed with a unique identity to allow the controller 18 to assign an appropriate trigger threshold to the proper RFID inventory device.

The sensor may be variously configured without departing from the scope of the present disclosure. In one exemplary embodiment, the value of the sensor is a capacitance. Such a sensor may be particularly useful for an auto-tunable RFID device, which is configured to vary its capacitance in order to optimize performance of the RFID device. For example, when an auto-tunable RFID device is associated with a low loss material (e.g., a t-shirt or other light garment), the RFID device will tend to auto-tune to a relatively high capacitance to decrease performance peak into a desired RFID reader operating band. In contrast, when an auto-tunable RFID device is associated with or placed into the proximity of a high loss material (e.g., an item having a high water content, such as a human body), the RFID device will tend to auto-tune to a relatively low capacitance to increase performance peak. A relatively high capacitance will call for adjustment of the trigger threshold in one direction, while a relatively low capacitance will call for adjustment of the trigger threshold in the opposite direction. It may also be the case that the sensed capacitance is at a level that requires no adjustment to the trigger threshold.

In another exemplary embodiment, the sensor may be configured as a dielectric sensor, in which case the value of the sensor is a dielectric permittivity. Such a sensor may be advantageous when an RFID device is not auto-tunable and instead has a performance that is only affected by external factors (e.g., the nature of the associated piece of inventory). Dielectric loading may be determined, in one example, by measuring a value associated with the RFID device, such as received signal strength, as the RFID reader changes frequency. When an RFID device is associated with a light dielectric, read performance will tend to increase with increasing read frequency, whereas read performance will tend to decrease with increasing read frequency for an RFID device associated with a heavy dielectric. When the sensor value indicates association of the RFID device with a light dielectric, the trigger threshold may be increased to prevent false alarms (without increasing the risk that the RFID device will not be properly detected). Conversely, when the sensor value indicates association of the RFID device with a heavy dielectric, the RFID device will have a lower performance, in which case the trigger threshold may be decreased to allow for proper detection of the RFID device without increasing the risk of false alarms. It may also be the case that the sensed dielectric permittivity is at a level that requires no adjustment to the trigger threshold.

In yet another exemplary embodiment, the sensed value may be a temperature. A piece of merchandise is typically held close to a person when it is being stolen, which tends to increase the sensed temperature. Accordingly, an increase in the temperature of an RFID inventory device indicates that there is an increased risk that an attempt is being made to steal the associated merchandise, in which case the controller 18 may act to decrease the trigger threshold to better ensure that the RFID inventory device is properly detected if it is moved into the detection zone 14 without being deactivated.

In another exemplary embodiment, the sensed value is a degree of movement. A product being stolen will be in motion towards the store exit (and towards the detection zone 14), whereas items on display in the inventory zone 12 are likely to be stationary. Accordingly, an increase in the degree of movement experienced by an RFID inventory device indicates that there is an increased risk that an attempt is being made to steal the associated merchandise, in which case the controller 18 may act to decrease the trigger threshold to better ensure that the RFID inventory device is properly detected if it is moved into the detection zone 14 without being deactivated. Exemplary motion detectors could be moving objects, such as beams or flaps, that either change a value such as a voltage on a port of the RFID chip of the RFID device, or similar devices that modulate the input impedance of the RFID chip and, therefore, impose a modulation on its response. Materials such as piezoelectric plastics, resistive materials that change when stretched or are compressed, or forms of parallel plate capacitors in which the plate separation is affected by motion may also be used.

However, while it may generally be proper to decrease the trigger threshold upon sensing movement, that is not always the case. For example, it may be the case that a particular RFID device is associated with a piece of inventory intended to be used to replenish the stock of merchandise in the inventory zone 12 at a time when the EAS system 10, 10' is active. This may be true of an RFID inventory device that has most recently been detected or read in the initial or preliminary read zone 40, as such an RFID inventory device has not yet been moved into the inventory zone 12 for display and consideration of the associated merchandise by customers. For a defined period (e.g., between 15 and 60 minutes), the trigger threshold for such an RFID inventory device may be set to a maximum (or at least elevated) level, as movement of such an RFID inventory device is not indicative of possible theft of the associated merchandise, but is instead indicative of the merchandise being moved into the inventory zone 12. After that time has elapsed, the controller 18 may treat the RFID inventory device as described above, which may include subsequent movement of the RFID inventory device causing the controller 18 to decrease the trigger threshold to better prevent theft of the merchandise associated with the RFID inventory device.

According to another aspect of the present disclosure, the trigger threshold may be adjusted based on the performance of an RFID inventory device in the initial or preliminary read zone 40. For example, if the initial or preliminary read zone 40 is configured as an RFID read chamber, each RFID device will be read or detected a certain number of times (due to the RFID read chamber including a plurality of antennas configured to emit signals within the RFID read chamber), which may vary based on a number of factors, including the nature of the associated piece of inventory. The number of times that an RFID inventory device is read may be encoded into the RFID device or stored in a database that is accessible by the controller 18 of the EAS system 10, 10'. The controller 18 may adjust the trigger threshold for a particular RFID inventory device based on the number of times that it is read in the RFID read chamber. A low number of reads may indicate that an RFID device is associated with a difficult-to-read product (e.g., merchandise having a high water content), whereas a high number of reads may indicate that an RFID device is associated with an easy-to-read product (e.g., a light garment). For an RFID inventory device having a low number of reads, the trigger threshold may be decreased to better ensure that the RFID inventory device is properly read (without increasing the risk of false alarms). For an RFID inventory device having a high number of reads, the trigger threshold may be increased to decrease the risk of false alarms without increasing the risk that the RFID inventory device will not be properly read or detected.

According to yet another aspect of the present disclosure, the trigger threshold may be adjusted upon the controller 18 determining that an RFID inventory device has been detected by the RFID reader associated with the read zone in which the RFID inventory device is positioned under predetermined conditions. For example, an RFID inventory device may be read or detected in the inventory zone 12 at a time when there are no people (or at least no customers) in the inventory zone 12 (e.g., as determined by a camera or other means associated with the controller 18) or when there are no RFID inventory devices being moved between the inventory zone 12 and the detection zone 14. RFID inventory devices detected in the inventory zone 12 under these conditions can be considered as being associated with merchandise that is at a lower risk of being stolen (compared to RFID inventory devices detected in the inventory zone 12 while customers are present). The trigger thresholds of such RFID inventory devices may be increased by the controller 18 to better ensure that such RFID inventory devices do not cause false alarms. Upon a customer entering the inventory zone 12, the trigger thresholds for the RFID inventory devices in the inventory zone 12 may be decreased by the controller 18, on account of the risk of theft increasing.

In some embodiments, any combination of capacitance, dielectric permittivity, temperature, and degree of movement may be used to adjust the trigger threshold.

While the preceding discussion has been specific to RFID inventory devices, it should be understood that a response or change in the operation of an EAS system may be initiated upon detection of an RFID guard device in the detection zone 14. As described above, an RFID guard device 36, 38 is intended to be positioned and remain within the inventory zone 12, associated with a piece of infrastructure 32, 34 used to display and/or support one or more pieces of inventory 24, 26. Thus, if an RFID guard device is detected in the detection zone 14, it may be indicative of an attempt to steal the associated piece of infrastructure (possibly along with any pieces of inventory associated with the piece of infrastructure) or indicative of the piece of infrastructure being placed too close to the detection zone 14, which may result in a false alarm being caused by an RFID inventory device associated with a piece of inventory associated with the piece of infrastructure corresponding to the RFID guard device.

Regardless of the circumstances under which an RFID guard device is detected in the detection zone 14, any of a number of responses may be initiated by the system controller 18 to prevent or reduce the likelihood of a false alarm. For example, one possible response is for the controller 18 to modify the trigger threshold of one or more RFID inventory devices associated with pieces of inventory associated with the piece of infrastructure corresponding to the RFID guard device (e.g., adjusting the trigger threshold of an RFID device secured to a shirt being worn by a mannequin in the inventory zone 12), which may include increasing the trigger threshold to reduce false alarms. Another possible response is modifying the amount of power transmitted by the RFID reader associated with the detection zone 14 and/or (if an antenna of the RFID reader is steerable) modifying the direction in which power is transmitted by the RFID reader to avoid detecting the RFID guard device. Yet another possible response is the controller 18 transmitting a signal indicative of a need for store personnel to move the piece of infrastructure associated with the RFID guard device (or the merchandise associated with the piece of infrastructure) away from the detection zone 14. In exemplary embodiments, the signal may be via a company network or via a light or other indicator associated with the piece of infrastructure to signify that there is a need to move the piece of infrastructure or associated merchandise to reduce the risk of false alarms.

RFID guard devices can come in different sensitivity grades; for example, an "A" may be high sensitivity, and if such an RFID guard device is detected in the detection zone 14, the risk of an overread is relatively low. "B" types may have relatively low sensitivity, and, if detected in the detection zone 14, indicate that the possibility of an overread is significant, in which case a different response may be initiated by the controller 18 compared to the response that would be initiated if an "A" type of RFID guard device was detected. To prevent issues, the trigger threshold for the components of the EAS system 10, 10' configured to detect the RFID guard devices can be increased.

In an alternative format, an RFID guard device may have more than one identity associated it. An RFID device, at its most basic, includes an RFID chip coupled to an antenna. To provide an RFID guard device with multiple identities, a plurality of different RFID chips may be coupled to a common antenna, with each RFID chip having a different sensitivity (e.g., one "A" type of RFID chip having a high sensitivity, one "B" type of RFID chip having a lower sensitivity, and one "C" type of RFID chip having an even lower sensitivity). By determining which chip or chips is/are being detected in the detection zone 14, the system controller 18 can determine the risk of false alarms and take various actions based on the sensitivity or sensitivities of the detected chip or chips.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An electronic article surveillance system, comprising:

a first RFID reader associated with a first read zone;

a piece of infrastructure configured to support and/or display at least one piece of inventory that is removably associated with the piece of infrastructure;

an RFID guard device secured with respect to the piece of infrastructure;

a second RFID reader associated with a second read zone, wherein the second RFID reader is configured to detect an RFID device associated with the piece of inventory at a trigger threshold, wherein:

the RFID device comprises a sensor configured to measure a capacitance value of the RFID device, and is further configured to auto-tune by varying its capacitance to optimize its performance based on proximity to materials; and a controller configured to, upon detection of the RFID guard device in the second read zone, initiate a response selected from the group consisting of modifying the trigger threshold, modifying an amount of power transmitted by the RFID reader associated with the second read zone, modifying a direction in which power is transmitted by the RFID reader associated with the second read zone, and transmitting a signal indicative of a need to move the piece of infrastructure away from the second read zone.

2. The electronic article surveillance system of claim 1, further comprising a second piece of infrastructure and a second RFID guard device secured with respect to the second piece of infrastructure, wherein the RFID guard devices have different sensitivity grades, and the controller is further configured to initiate a different response depending on the sensitivity grade of the RFID guard detected by the RFID reader.

3. The electronic article surveillance system of claim 1, wherein the RFID guard device includes a plurality of RFID chips coupled to an antenna, each of the plurality of RFID chips is configured to be detected at a different power transmitted by the RFID reader, and the response initiated by the controller is based at least in part on which RFID chip is detected by the RFID reader.

4. The electronic article surveillance system of claim 1, wherein the same RFID reader is associated with the first and second read zones.

5. The electronic article surveillance system of claim 1, wherein separate RFID readers are associated with the first and second read zones.

6. The electronic article surveillance system of claim 1, wherein: the RFID device auto-tunes to a relatively high capacitance when associated with a low loss material to decrease performance peak, and the RFID device auto-tunes to a relatively low capacitance when associated with a high loss material to increase performance peak.

7. A method of controlling an electronic article surveillance system including a controller, a first Radio-Frequency Identification (RFID) reader associated with a first read zone, a second RFID reader associated with a second read zone, a piece of infrastructure having an associated RFID guard device and configured to support and/or display at least one piece of inventory that is removably associated with the piece of infrastructure, and an RFID device associated with the piece of inventory at a trigger threshold, wherein the RFID device comprises a sensor configured to measure a capacitance value of the RFID device, and wherein the RFID device is configured to auto-tune by varying its capacitance to optimize performance of the RFID device based on proximity of materials;

the method comprising:

detecting the RFID guard device in the second read zone; and initiating, upon said detection of the RFID guard device, a response selected from the group consisting of modifying the trigger threshold, modifying an amount of power transmitted by an RFID reader associated with the second read zone, modifying a direction in which power is transmitted by the RFID reader associated with the second read zone, and transmitting a signal indicative of a need to move the piece of infrastructure away from the second read zone.

8. The method of claim 7, further comprising:

auto-tuning the RFID device to a relatively high capacitance when the RFID device is associated with a low loss material to decrease performance peak; and auto-tuning the RFID device to a relatively low capacitance when the RFID device is associated with a high loss material to increase performance peak.

* * * * *